(12) United States Patent
Anastassov et al.

(10) Patent No.: US 9,958,283 B2
(45) Date of Patent: May 1, 2018

(54) DETERMINING SPEED INFORMATION (71) Applicant: HERE Global B.V., Eindhoven (NL)

(72) Inventors: Anton Anastassov, Naperville, IL (US);
Dongwook Jang, Lisle, IL (US);
Gavril Giurgiu, Deerfield, IL (US)

(73) Assignee: HERE Global B.V., Eindhoven (NL)

( * ) Notice: Subject to any disclaimer, the term of this patent is extended or adjusted under 35 U.S.C. 154(b) by 0 days. days.

(21) Appl. No.: 15/163,963

(22) Filed: May 25, 2016

(65) Prior Publication Data
US 2017/0343369 A1    Nov. 30, 2017

(51) Int. Cl.
*G01C 21/00* (2006.01)
*G08G 1/00* (2006.01)
*G08G 1/16* (2006.01)
*G01C 21/26* (2006.01)
*G01C 21/34* (2006.01)
*H04L 29/08* (2006.01)
*G08G 1/01* (2006.01)
(Continued)

(52) U.S. Cl.
CPC ....... *G01C 21/3492* (2013.01); *G08G 1/0112* (2013.01); *G08G 1/0125* (2013.01); *G08G 1/0145* (2013.01); *G08G 1/052* (2013.01); *G08G 1/096725* (2013.01); *G08G 1/096775* (2013.01); *H04L 67/12* (2013.01); *H04L 67/30* (2013.01)

(58) Field of Classification Search
CPC .... G01C 21/3492; G01C 21/00; G01C 21/26; G01C 21/34; G08G 1/052; G08G 1/0125; G08G 1/00; G08G 1/16
See application file for complete search history.

(56) References Cited

U.S. PATENT DOCUMENTS 6,385,539 B1    5/2002 Wilson et al.
6,850,841 B1    2/2005 Casino
(Continued)

FOREIGN PATENT DOCUMENTS

CN    102540978 A    7/2012
EP    2 180 456 A1   4/2010
(Continued)

OTHER PUBLICATIONS

"Acceleration smoothing", Smoothing results—R&D Traffic Technologies Group (TTG)—HERE Confluence Wiki, Retrieved on Sep. 28, 2016, Webpage available at : https://confluence.in.here.com/display/PDOD/Smoothing+results.

(Continued)

*Primary Examiner* — Yonel Beaulieu
(74) *Attorney, Agent, or Firm* — Alston & Bird LLP (57) ABSTRACT

Methods, apparatuses, systems, and computer program products are presented for determining a speed profile for a selected link of a travel network. Map data representing, at least in part, a travel network is obtained or held available. At least one speed profile for at least one selected link of the travel network is determined at least partially based on speed represented by a plurality of probe data points of one or more probe data sets of a plurality of probe data sets and a weighting function for weighting the speeds represented by the plurality of probe data points of one or more probe data sets of the plurality of probe data sets. The one or more probe data sets are associated with the selected link for which the speed profile is determined.

31 Claims, 5 Drawing Sheets

(51) Int. Cl.
*G08G 1/052* (2006.01)
*G08G 1/0967* (2006.01)

(56) References Cited

U.S. PATENT DOCUMENTS

| | | |
|---|---|---|
| 8,005,602 B2 | 8/2011 | Bando et al. |
| 8,406,939 B2 | 3/2013 | Jackson et al. |
| 8,494,759 B2 | 7/2013 | Hada |
| 8,615,361 B2 | 12/2013 | Papajewski et al. |
| 9,053,632 B2 | 6/2015 | Shen et al. |
| 9,240,123 B2 | 1/2016 | Stenneth |
| 9,755,850 B2 | 9/2017 | Stolfus |
| 2004/0172189 A1 | 9/2004 | Maeda |
| 2007/0192013 A1 | 8/2007 | Bando et al. |
| 2008/0046165 A1 | 2/2008 | Downs et al. |
| 2008/0294331 A1 | 11/2008 | Fushiki et al. |
| 2010/0256835 A1 | 10/2010 | Mudalige |
| 2011/0153166 A1 | 6/2011 | Yester |
| 2011/0307165 A1 | 12/2011 | Hiestermann et al. |
| 2012/0059535 A1 | 3/2012 | Jackson et al. |
| 2012/0059574 A1 | 3/2012 | Hada |
| 2012/0095682 A1 | 4/2012 | Wilson |
| 2012/0283942 A1 | 11/2012 | T'Siobbel et al. |
| 2013/0021382 A1 | 1/2013 | Morlock et al. |
| 2013/0275033 A1 | 10/2013 | Bastiaensen et al. |
| 2013/0282264 A1 | 10/2013 | Bastiaensen et al. |
| 2013/0297196 A1 | 11/2013 | Shida |
| 2013/0311076 A1 | 11/2013 | Mieth et al. |
| 2014/0149028 A1 | 5/2014 | Chapman et al. |
| 2014/0278052 A1 | 9/2014 | Slavin et al. |
| 2014/0288811 A1 | 9/2014 | Oura |
| 2014/0289267 A1 | 9/2014 | Felix et al. |
| 2014/0297182 A1 | 10/2014 | Casson et al. |
| 2015/0006069 A1 | 1/2015 | Kwon et al. |
| 2015/0120174 A1 | 4/2015 | Lewis |
| 2015/0300825 A1 | 10/2015 | Manoliu et al. |
| 2015/0345971 A1 | 12/2015 | Meuleau et al. |
| 2016/0223348 A1 | 8/2016 | Witte et al. |
| 2017/0032667 A1* | 2/2017 | Fowe .................. G08G 1/0112 |
| 2017/0341660 A1 | 11/2017 | Jang et al. |

FOREIGN PATENT DOCUMENTS

| | | |
|---|---|---|
| WO | WO 2014/091982 A1 | 6/2014 |
| WO | WO-2015/145637 A1 | 10/2015 |

OTHER PUBLICATIONS

"Smoothing Spline", Wikipedia, Retrieved on Sep. 28, 2016, Webpage available at : https://en.wikipedia.org/wiki/Smoothing_spline.
Ou et. Al, "A Theoretical Framework for Traffic Speed Estimation by Fusing Low-resolution Probe Vehicle Data", IEEE Transactions on Intelligent Transportation Systems, vol. 12, No. 3, Sep. 2011, pp. 747-756.
International Search Report and Written Opinion from International Patent Application No. PCT/EP2017/062633, dated Sep. 13, 2017, 15 pages.
"Fit a Smoothing Spline", Stat.ethz.ch/R-manual, Retrieved on Oct. 19, 2016, Webpage available at : https:/stat.ethz.ch/R-manual/R-devel/library/stats/html/smooth.spline.html.
"Friedman's SuperSmoother", Stat.ethz.ch/R-manual, Retrieved on Sep. 27, 2016, Webpage available at : https://stat.ethz.ch/R-manual/R-patched/library/status/html/supsmu.html.
"Local Polynomial Regression Fitting", Stat.ethz.ch/R-manual, Retrieved on Sep. 27, 2016, Webpage available at : https://stat.ethz.ch/R-manual/R-devel/library/stats/html/loess.html.
"Rolling Means/Maximums/Medians / Sums", R project, Retrieved on Sep. 27, 2016, Webpage available at : http://search.r-project.org/library/zoo/html/rollmean.html.
"Scatter Plot Smoothing", Stat.ethz.ch/R-manual, Retrieved on Oct. 19, 2016, Webpage available at : https://stat.ethz.ch/R-manual/R-devel/library/stats/html/lowess.html.
"The R Project for Statistical Computing", R project, Retrieved on Sep. 27, 2016, Webpage available at : https://www.r-project.org.
Aguilera et al., "A New Kind of Fundamental Diagram with an Application to Road Traffic Emission Modelling", Journal of advanced transportation, vol. 48, 2014, pp. 1-23.
Duran et al., "GPS Data Filtration Method for Drive Cycle Analysis Applications", SAE Technical Paper, Apr. 16, 2012, 6 Pages.
Jun et al., "Smoothing Methods to Minimize Impact of Global Positioning System Random Error on Travel Distance, Speed, and Acceleration Profile Estimates", Journal of the Transportation Research Board, 1972, p. 141-150.
Labakhua et al., "Smooth Trajectory Planning for Fully Automated Passengers Vehicles", In informatics in control, automation and robotics III, 2007, 8 pages.
Tong et al., "Traffic Information Deriving Using GPS Probe Vehicle Data Integrated With GIS", Center for Urban and Regional Analysis and Department of Geography, Nov. 17, 2005, 24 pages.
Villagra et al., "Smooth Path and Speed Planning for an Automated Public Transport Vehicle", Robotics and Autonomous Systems, vol. 60, No. 2, Feb. 2012, pp. 252-265.
Extended European Search Report for European Patent Application No. 17172827.2 dated Oct. 4, 2017, 4 pages.
Office Action for U.S. Appl. No. 15/164,172 dated Dec. 29, 2017, 20 pages.
Office Action for U.S. Appl. No. 15/164,096 dated Jan. 10, 2018, 20 pages.
Office Action for U.S. Appl. No. 15/164,058 dated Jan. 12, 2018, 33 pages.
Office Action for U.S. Appl. No. 15/366,254 dated Jan. 17, 2018, 24 pages.

* cited by examiner

DETERMINING SPEED INFORMATION

FIELD

The invention relates to the field of determining speed information and more specifically to determining speed information (e.g. one or more speed profiles) for a vehicle (e.g. for autonomous vehicles, highly-assisted-driving vehicles and/or vehicles with predictive cruise control).

BACKGROUND

There have been multiple recent developments in the transportation technology that are revolutionizing the way people experience driving. Such technologies include connected vehicles with mobile access to the internet, adaptive cruise control or autonomous navigation and platooning. Adaptive cruise control systems automatically change the vehicle speed to accommodate curves, traffic congestions or road incidents. Autonomous vehicles take a step farther by taking control not only of the vehicle speed but also of the wheel steering, when turning or changing lanes, with the ultimate goal of taking full control of the whole driving process and thus enabling drivers to become passengers, with all the benefits associated with being relieved from the task of driving. Finally, platooning of multiple trucks would save energy, reduce CO2 emissions and reduce the strain of human drivers. Platooning could open new avenues not only in the trucking industry but also for consumers by releasing the drivers from the task of maneuvering the vehicles. In such platoons the lead vehicle drives either manually or autonomously, followed by vehicles without autonomous driving capacity, in which the drivers become passengers.

SUMMARY OF SOME EMBODIMENTS OF THE INVENTION

In all of the three cases described above, adaptive cruise control, autonomous navigation and platooning, it is conceivable that the vehicles would benefit from using the collective knowledge accumulated from other traffic participants such as human and/or robotic driving experiences. An important quantity that defines the motion of a vehicle is the speed. Traffic participants travel at different speeds on a given link such as a road section. The distribution of these speeds on the link may be characterized by one or more statistical distribution descriptors, including, but not limited to, mean speed, median speed, other speed percentiles, and various measures of the distribution width and shape. The evolution of one or more of these descriptors along a link may be understood to be represented by a speed profile. For example, a median speed profile may represent one or more speeds along the link such that half of the vehicles travel slower, and the other half travel at higher speeds. The speed profiles may be created with high spatial granularity along the link. Such speed profiles can be used by predictive cruise control and autonomous vehicles to provide a human-like driving experience.

According to an exemplary aspect of the invention, a method is presented, which comprises:
  obtaining or holding available map data representing, at least in part, a travel network,
  determining at least one speed profile for at least one selected link of the travel network at least partially based on speeds represented by a plurality of probe data points of one or more probe data sets of a plurality of probe data sets and a weighting function for weighting the speeds represented by the plurality of probe data points of one or more probe data sets of the plurality of probe data sets, the one or more probe data sets associated with the selected link for which the speed profile is determined.

The presented method may be performed by an apparatus or by a plurality of apparatuses. For example, the presented method may be performed by any one embodiment of the below presented apparatuses. Alternatively or additionally, the presented method may be performed by a plurality of any one embodiment of the below presented apparatuses.

Holding available the map data may be understood to mean that the map data are stored in memory means of an apparatus performing the method. Example of memory means include a volatile memory and a non-volatile memory. Alternatively or additionally, the map data could be obtained by determining the map data or by receiving the map data, for example by a communication interface of an apparatus performing the presented method.

The map data may represent the travel network at least in part by representing a map of at least a part of the travel network.

A link may be a section of the travel network, for example a section between two junctions of the travel network. A link may be a directional link (i.e. only relating to one travel direction on the link) or a non-directional link (relating to more than one travel direction on the link). Each link may be associated with a link identifier (e.g. a unique link identifier). The at least one selected link could be such a link of the travel network, for example an arbitrary link of the travel network which is selected for performing the method.

The plurality of probe data sets may comprise at least two probe data sets, more specifically at least three probe data sets. For example, the plurality of probe data sets may comprise more than 1000 probe data sets.

The plurality of probe data points may comprise at least two probe data points, more specifically at least three probe data points. For example, the plurality of probe data points may comprise more than 100 probe data points.

A probe data set may be understood to be associated with the selected link if it is associated with a travel route including the selected link. For example, in determining a respective speed profile for the selected link only probe data sets may be used that are associated with the selected link.

A speed profile for the selected link may be understood to represent speed information, for example speed information for a vehicle. The speed profile may for example be a link-specific speed profile or a potential travel path-specific speed profile. A link-specific speed profile may be understood to be a speed profile for the selected link representing speed information for all vehicles travelling on the selected link (irrespective of the travel of the vehicles). A potential travel path-specific speed profile may be understood to be a speed profile for a potential travel path of the selected link representing speed information only for vehicles travelling on the selected link on a travel route including the potential travel path.

The presented method may be for determining speed information, for example for determining speed information for a vehicle.

According to a further exemplary aspect of the invention, an apparatus is presented, which comprises means for performing, at least in part, the steps of any one embodiment of the presented method.

The means of the presented apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus may comprise a single means for all functions, a common plurality of means for all functions, or a plurality of different means for different functions.

According to a further exemplary aspect of the invention, another apparatus is presented, which comprises at least one processor and at least one memory including computer program code, the at least one memory and the computer program code with the at least one processor configured to cause the apparatus at least to perform, at least in part, the steps of any one embodiment of the presented method.

The presented apparatuses may be modules or components for a device, for example chips. Alternatively, the presented apparatuses may be devices. The presented apparatuses may comprise only the disclosed components (e.g. means) or may further comprise one or more additional components.

The presented apparatuses may be for determining speed information, for example for determining speed information for a vehicle.

The presented apparatuses may be or may be part of one of a server, a stationary device, a module for a device, a vehicle or an embedded navigation device of a vehicle.

According to a further exemplary aspect of the invention, a system is presented which comprises a plurality of apparatuses which are configured to perform, together, the steps of any one embodiment of the presented method. The apparatuses of the presented system may at least partially correspond to any one of the presented apparatuses according to an exemplary aspect of the invention. For example, the presented system may comprise a server or a server cloud for determining speed information for a vehicle and a vehicle.

According to a further exemplary aspect of the invention, a non-transitory computer readable storage medium is presented, in which computer program code is stored. The computer program code causes at least one apparatus to perform the steps of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is presented, the computer program code when executed by a processor causing an apparatus to perform the steps of any one embodiment of the presented method.

In the following, further features and embodiments of these exemplary aspects of the invention will be described.

According to an exemplary embodiment of the invention, the travel network is a road network. Accordingly, a link of the travel network represented by the map data may be understood to be a road section of the road network, for example a road section between two junctions of the road network.

According to an exemplary embodiment of the invention, the presented method further comprises obtaining or holding available the plurality of probe data sets.

Holding available the plurality of probe data sets may be understood to mean that the plurality of probe data sets is stored in memory means of an apparatus performing the method.

Alternatively or additionally, the plurality of probe data sets could be obtained by receiving the plurality of probe data sets, for example by communication means of an apparatus performing the presented method.

According to an exemplary embodiment of the invention, each probe data point of the plurality of probe data points represents a position and a speed, for example a position of a mobile device and a speed of this mobile device at this position. Examples of such a mobile device may be a vehicle, a navigation device and/or a smartphone.

The position may be a position associated with a position captured by the mobile device. For example, the position may be a Global Navigation Satellite System (GNSS) position captured by a GNSS sensor of the mobile device. Alternatively or additionally, the position may be a map matched GNSS position representing a GNSS position captured by a GNSS sensor of the mobile device that has been matched to the travel network represented by the map data.

The speed may be associated with a speed captured by the mobile device. Alternatively or additionally, the speed may be determined at least partially based on one or more positions captured by the mobile device, for example by calculating the speed based on the distance between two positions captured by the mobile device and the time difference between capturing these two positions.

According to an exemplary embodiment of the invention, each probe data set of the plurality of probe data points may comprise a sequence of probe data points representing a position and a speed of a specific mobile device. This may have the effect that a probe data set of the plurality of probe data sets and the probe data points of this probe data set of the plurality of probe data sets may be associated with a travel route of a specific mobile device. For example, the probe data points of the probe data set represent positions and speeds of the specific mobile device when travelling along this travel route. Each of this probe data sets may thus be considered to represent historic experiences of human drivers travelling along this travel route. A considerable amount of such probe data sets has been collected by service providers over time and this plurality of (historic) probe data sets can be used for determining speed profiles. To avoid a falsification of the speed profiles due to traffic congestions, only probe data sets collected during weekends and during night, from 8 pm to 7 am, during business days may be used for determining speed profiles.

A probe data set may be understood to be associated with a selected link if the probe data set is associated with a travel route of a specific mobile device including the selected link. This may have the effect that a speed profile for the selected link is determined based on one or more probe data points representing one or more speeds and positions of specific mobile devices which were travelling along a travel route including the selected link.

Each probe data point of a specific probe data set may comprise the identifier of the probe data set. The identifier may be indicative for a session of a service provider collecting probe data sets of a mobile device, a mobile device, or a combination thereof.

According to an exemplary embodiment of the invention, the presented method further comprises weighting one or more speeds represented by one or more probe data points of the plurality of probe data points according to the weighting function by a respective weighting factor being proportional to a speed represented by a respective probe data point of the one or more probe data points that is weighted by the respective weighting factor. These one or more probe data points of the plurality of probe data points may represent positions on the selected link, for example on the one or more subsequent segments of the selected link.

For example, the weighting factor may be calculated according to the weighting function, for each probe data point of the one or more probe data points, based on a probe data point frequency associated with the respective data point, the speed represented by the respective probe data point and a length of the selected link or of a segment of the selected link as follows:

$$W = 1/N = v/L * F$$

(with W=respective weighting factor, N=number of probe data points of the respective probe data set representing a position on the link or the segment of the link, v=speed represented by the respective probe data point, F=probe data point frequency associated with the respective probe data point, L=length of the selected link or of a segment of the selected link).

The probe data point frequency associated with the respective probe data point may be understood to mean the probe data point frequency of the sequence of probe data points of the respective probe data point set comprising the respective probe data point.

The respective weighting factor as calculated above corresponds to the reciprocal of the number of probe data points of the respective probe data set representing a position on the selected link or the segment of the selected link. Accordingly, the weighting factor may be determined, for each probe data point of the one or more probe data points, by determining the reciprocal for the number of probe data points of the respective probe data set representing a position on the selected link or on a segment of the selected link.

As a result of the weighting, one or more weighted speeds may be obtained.

According to an exemplary embodiment of the invention, a speed profile for the selected link represents one speed for the selected link or a plurality of speeds for a plurality of subsequent segments of the selected link.

Each of the plurality of speeds may be a speed for a respective segment of the plurality of subsequent segments of the selected link. For example, the selected link may be divided into the plurality of subsequent segments. This may enable a high spatial granularity of the speed profile. Each of the segments may have the same length (e.g. 10 m). Alternatively the segments may have at least partially different length.

According to an exemplary embodiment of the invention, the at least one speed profile is at least partially determined by calculating one of one or more weighted mean speeds, one or more weighted speed percentiles, or one or more combinations thereof for the selected link or for one or more subsequent segments of the selected link.

For example, this calculating is at least partially based on one or more speeds represented by one or more probe data points of the plurality of probe data points of the one or more probe data sets associated with the selected link. These one or more probe data points may represent positions on the selected link, for example on the one or more subsequent segments of the selected link.

For calculating the one or more weighted mean speeds or one or more weighted speed percentiles, these one or more speeds may be weighted by a respective weighting factor according to the weighting function as presented above.

Examples of calculated weighted speed percentiles are a weighted 10% speed percentile, a weighted 25% speed percentile, a weighted 30% speed percentile, a weighted 50% speed percentile (i.e. the weighted median speed), a weighted 70% speed percentile, a weighted 75% speed percentile, a weighted 90% speed percentile or combinations thereof.

For example, for determining a speed profile representing a plurality of speeds for a plurality of subsequent segments of the selected link, for each segment of the subsequent segments, a weighted mean speed or a weighted speed percentile may be calculated based on probe data points representing a position on the respective segment of the selected link.

For example, for determining a speed profile representing one speed for the selected link, a weighted mean speed or a weighted speed percentile may be calculated based on probe data points representing a position on the selected link.

For example, different speed profiles could be determined for vehicles transporting human passengers (which have to account for the passenger comfort) and for vehicles transporting only goods or traveling empty to pick up passengers. In the latter case, without the constraints related to the human comfort, it is conceivable that autonomous vehicles would drive much faster than the ones driven by humans, while still maintaining the highest safety standards. For speed profiles for vehicles transporting human passengers for example the weighted 50% speed percentile (i.e. the weighted median speed) or the weighted 70% speed percentile may be used; and for speed profiles for vehicles transporting only goods or traveling empty to pick up passengers for example the weighted 75% speed percentile or the weighted 90% speed percentile may be used.

According to an exemplary embodiment of the invention, the presented method further comprises determining whether one or more probe data sets of the plurality of probe data sets are associated with the selected link based on one or more positions represented by one or more probe data points of the one or more probe data sets. For example, a probe data set may be determined to be associated with a selected link, if one or more probe data points of the probe data set represent positions on the selected link.

According to an exemplary embodiment of the invention, the presented method further comprises determining, for the selected link of the travel network, a plurality of potential travel paths, wherein each potential travel path of the plurality of potential travel paths for the selected link is at least partially defined by an incoming link of the travel network and an outgoing link of the travel network that are linked by the selected link and a direction of travel from the incoming link to the outgoing link on the selected link, wherein, for each potential travel paths of the plurality potential travel paths, a respective speed profile for the selected link is determined.

As a result of the determining, for the at least one selected link, the plurality of potential travel paths an indication (e.g. a definition) for each potential travel path of the plurality of potential travel paths may be obtained. For example, a list defining the plurality of potential travel paths for the selected link may be obtained.

A potential travel path of the selected link may be uniquely defined by specifying the selected link, an incoming link and an outgoing link and, optionally, a direction of travel on the selected link, the incoming link and the outgoing link. For example, each link may be specified by a link identifier. The direction of travel may correspond to the direction from the incoming link through the selected link to the outgoing link and, thus, may for example be derivable from the specification of the incoming link and the outgoing link. It may thus not be necessary to specify the direction of travel for defining a potential travel path of the selected link.

An incoming link may be understood to be a link adjacent to the selected link through which the selected link may be entered, and an outgoing link may be understood to be a link adjacent to the selected link through which the selected link may be exited.

Generally, for a selected link having N incoming links and M outgoing links, there exist N×M potential travel paths.

Accordingly, each potential travel of the plurality of potential travel paths may represent a specific option for entering the at least one selected link and for exiting the at least one selected link and, thus, each potential travel path of the plurality of potential travel paths may have different features (e.g. a different course).

Determining the plurality of potential travel paths may be performed at least partially based on the map data.

The plurality of potential travel paths may be understood to comprise at least two potential travel paths, more specifically at least three potential travel paths.

A probe data set may be understood to be associated with a potential travel path of the plurality of potential travel paths if the probe data set is associated with a travel route (e.g. a travel route of a of a specific mobile device) including the potential travel path.

For example, a probe data set of the plurality of probe data sets may be identified to be associated with a potential travel path of the plurality of potential travel paths if the sequence of probe data points of the probe data set represent one or more positions on or associated with an incoming link, the selected link and an outgoing link at least partially defining the potential travel path.

In determining, for each potential travel path of the plurality of potential travel paths, a respective speed profile only probe data sets may be used that are associated with the respective potential travel path. This may have the effect that different speed profiles may be obtained for different potential travel paths which may enable to determine speed profiles adapted to the different features (e.g. different courses) of the different travel paths (e.g. a speed profile for a curvy potential travel path may be different than a speed profile for a straight potential travel path). These speed profiles may be thus potential travel path-specific speed profiles for the selected link.

According to an exemplary embodiment of the invention, the presented method further comprises providing or generating speed map data representing an association of the map data and a plurality of speed profiles for links of the travel network, the plurality of speed profiles comprising the at least one speed profile determined for the selected link.

According to an exemplary embodiment of the invention, the presented method further comprises:
  determining speed information for at least one vehicle;
  providing the speed information to the at least one vehicle.

For example, the at least one vehicle may request speed information for a travel route from an apparatus performing the presented method (e.g. a server, e.g. a server of the presented system). The request may specify the links (e.g. by link identifiers) and/or potential travel paths (e.g. by specifying the links at least partially defining the potential travel paths) included in the travel route.

The travel route may have been determined by the vehicle based on map data obtained or hold available by the at least one vehicle. Alternatively or additionally, the travel route may have been determined by a server (e.g. a server of the presented system) for the vehicle. Determining the travel route information may be at least partially based on a starting position and a destination position. For example, the starting position may represent the current position of the vehicle and the destination position may represent a position of a desired destination of a user of the vehicle. The starting position and the destination position may be obtained by the at least one vehicle, for example by capturing the current position of the vehicle by a GNSS sensor and/or by receiving a user input on a user interface of the vehicle.

The speed information for the at least one vehicle may be determined to represent the speed profiles for the potential travel paths that are included in the travel route. For example, the speed information may at least partially represent the at least one speed profile for the at least one selected link.

Providing the speed information to the at least one vehicle may be understood to mean that the speed information are communicated or caused to be communicated to the at least one vehicle by an apparatus performing the presented method (e.g. by a server, e.g. a server of the presented system), for example by a communication interface of the apparatus. Alternatively or additionally, the speed information may be provided for use by the at least one vehicle, for example, for, at least in part, autonomously driving along the travel route. The speed information may cause the at least one vehicle to at least partially control and/or adapt its speed accordingly when driving along the route represented by the travel route information.

For example, the at least one vehicle may be, at least in part, an autonomous vehicle, a highly-assisted-driving vehicle, a vehicle with predictive cruise control, or a combination thereof. In certain embodiments of the invention, the vehicle may determine the speed information. Alternatively or additionally, the speed information may be determined by a server and communicated by the server to the vehicle.

According to an exemplary embodiment of the invention, the presented method is performed for a plurality of links of the travel network as selected link. This may be understood to mean that the steps of the presented method may be performed (e.g. repeated) for further links of the plurality of links of the travel network as selected link.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

The following description serves to deepen the understanding of the present invention and shall be understood to complement and be read together with the description of example embodiments of the invention as provided in the above SUMMARY section of this specification.

By way of example, considering an autonomous vehicle driving in free flow conditions, the autonomous vehicle equipped with high performance sensors and sufficient computing power continuously scans the environment and decides, in real time, the optimal driving speed, taking into consideration multiple road factors such as speed limit, slope, curvature, number of lanes or lane widths. As these factors change along the road, the vehicle may continuously adapt the speed to a value which is optimal from the points of view of both safety and, if humans are transported by the vehicle, driver/passenger comfort. While the vehicle may be able to perform such computations in real time and to adopt the optimal speed based on sensor data only, such computations may be aided by "prior" knowledge for example provided by travel route information representing the current travel route of the vehicle and speed information representing speed profiles for the current travel route of the vehicle. For example, the vehicle could be configured to adapt the vehicle speed by default according to the speed information, while the final decision regarding the speed would be taken based on the information collected by the real time sensors. Since the vehicle may be already in the most probable state according to the historical experience of other drivers encoded in the speed profile, the real time changes dictated by the sensor observations would be minimal and only needed when deviations from the historical norm are observed. Such deviations may be expected in many cases which include recurring traffic congestion associated with the normal business hours and non-recurring congestion due to adverse weather conditions or incidents. The difference between an autonomous vehicle driving with and without this prior knowledge may be thought as analogous to the difference between a human driving in a familiar or un-familiar area. The same as the human driver is required to focus harder to understand the surroundings and navigate in an un-familiar area, the same way, an autonomous vehicle is expected to require more sensor information and computational power when driving without any prior knowledge.

Autonomous vehicles and vehicles equipped with predictive control can thus benefit from having available speed profiles or speed map data which provides typical driving speeds on every link with high spatial granularity. Such speed profiles can be used by predictive cruise control and autonomous vehicles to provide a human-like driving experience.

Figure 1A:
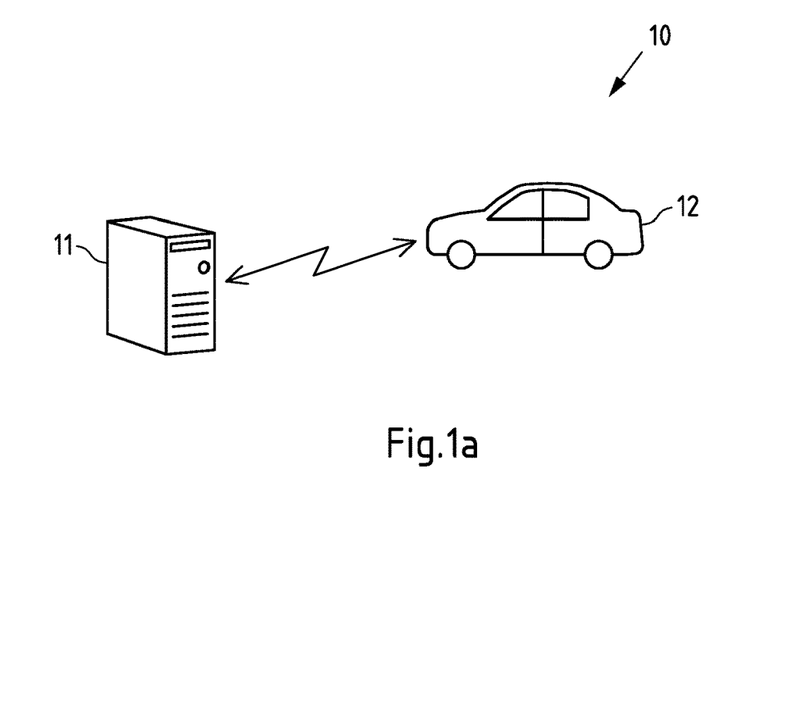
FIG. 1*a* is a block diagram of an exemplary embodiment of a system according to the invention.

FIG. 1a is a schematic high-level block diagram of a system 10 according to an exemplary aspect of the invention. System 10 comprises a server 11, which may alternatively be embodied as a server cloud (e.g. a plurality of servers connected e.g. via the internet and providing services at least partially jointly), and a vehicle 12.

According to exemplary embodiments of the present invention, server 11 may determine speed information for vehicle 12.

Vehicle 12 may be, at least in part, an autonomous vehicle, a highly-assisted-driving vehicle, a vehicle with predictive cruise control, or a combination thereof.

Communication between server 11 and vehicle 12 may for example take place at least partially in a wireless fashion, e.g. based on cellular radio communication or on Wireless Local Area Network (WLAN) based communication, to name but a few examples. In this way, mobility and connectivity of vehicle 12 is guaranteed.

Figure 1B:
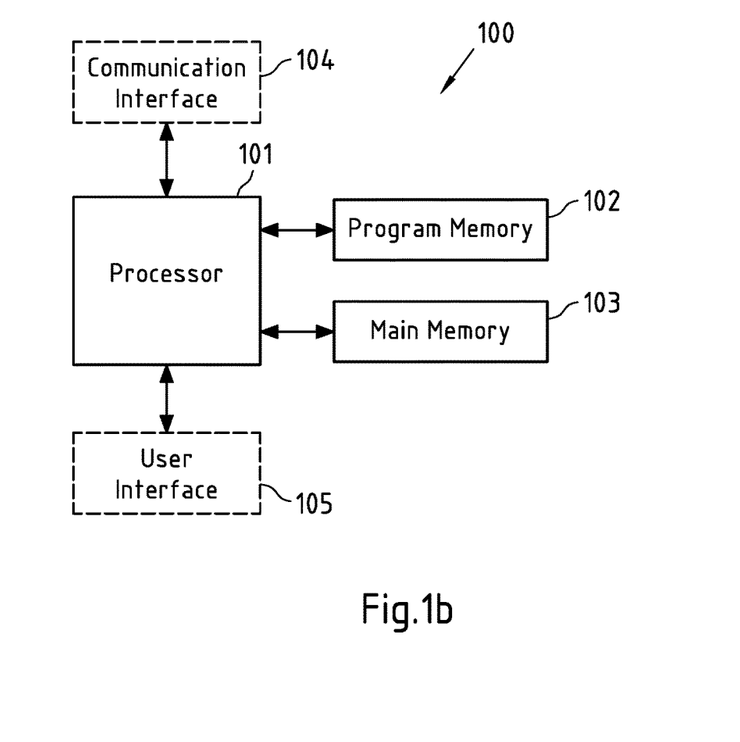
FIG. 1*b* is a block diagram of an exemplary embodiment of an apparatus according to the invention.

FIG. 1b is a block diagram of an apparatus 100 according to an exemplary aspect of the invention. Apparatus 100 may for example represent server 11 of system 10. Alternatively or additionally, apparatus 100 may for example represent an embedded navigational device of vehicle 12 of system 10.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform one or more of the embodiments of a method (or parts thereof) according to the invention (as for instance further described below with reference to FIGS. 2a and 2b), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a first memory portion that is fixedly installed in apparatus 100, and a second memory portion that is removable from apparatus 100, for instance in the form of a removable SD memory card.

Main memory 103 may for instance be a volatile memory. It may for instance be a DRAM memory, to give non-limiting example. It may for instance be used as a working memory for processor 101 when executing an operating system and/or programs.

Processor 101 further controls an optional communication interface 104 configured to communicate with other devices (e.g. with server 11 or vehicle 12), for example by receiving and/or sending data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the invention, communication interface 104 is inter alia configured to allow communication based on a 2G/3G/4G/5G cellular radio communication and/or a non-cellular radio communication, such as for instance a WLAN communication. Alternatively or additionally, the communication may equally well be based on a wirebound communication connection or a combination of wireless and wirebound communication connections. Accordingly, the communication interface 104 may thus comprise circuitry such as modulators, filters, mixers, switches to allow a wirebound transmission and/or reception of signals. In embodiments of the invention, communication interface 104 is inter alia configured to allow communication based on an Ethernet communication such as a LAN (Local Area Network) communication.

Processor 101 further controls an optional user interface 105 configured to present information to a user of apparatus 100 and/or to receive information from such a user. User interface 105 may for instance be the standard user interface via which a user of apparatus 100 controls other functionality thereof. Examples of such a user interface are a touch-sensitive display, a keyboard, a touchpad, a display, etc.

The components 102-105 of apparatus 100 may for instance be connected with processor 101 by means of one or more serial and/or parallel busses.

It is to be understood that apparatus 100 may comprise various other components (e.g. a positioning sensor such as a Global Navigation Satellite System (GNSS) sensor).

Figure 2A:
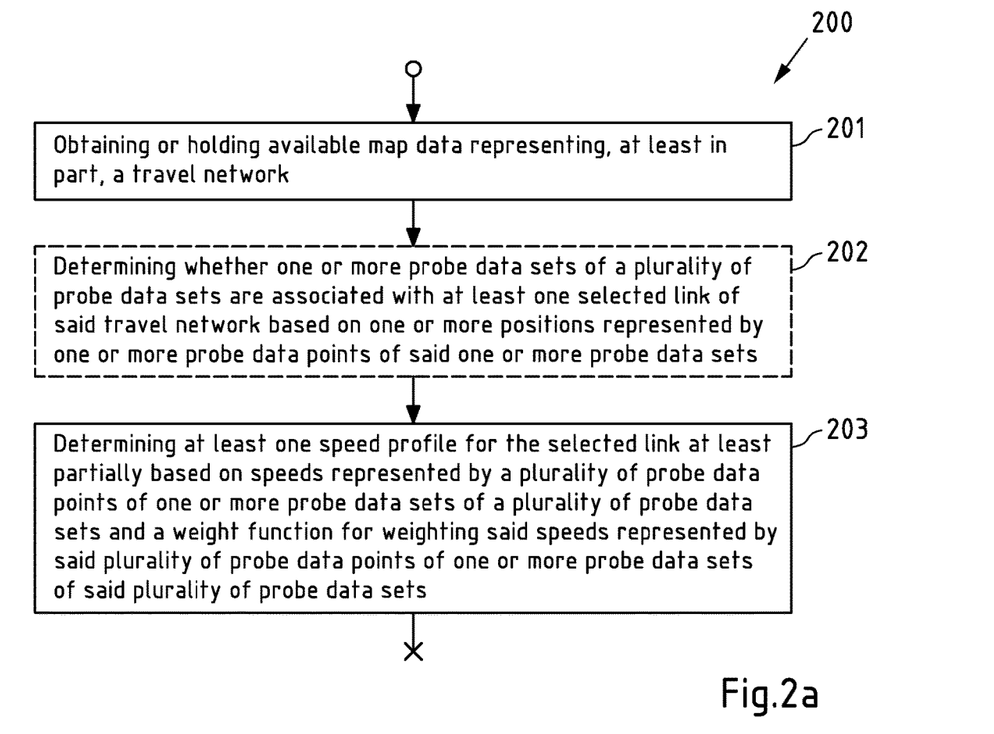
FIG. 2*a-b* are flowcharts of exemplary embodiments of a method according to the invention.

FIG. 2a is a flowchart 200 illustrating an exemplary embodiment of a method according to the invention. In the following, it is assumed that the steps of this flowchart 200 are performed by server 11 of system 10 of FIG. 1a.

In a step 201, server 11 obtains or holds available map data representing, at least in part, a travel network. The map data may for example be received by communication interface 104 of server 11 and, subsequently, be stored in memory 102 of server 11. For example, the map data may be part of a navigation database stored in memory 102 of server 11.

Figure 3A:
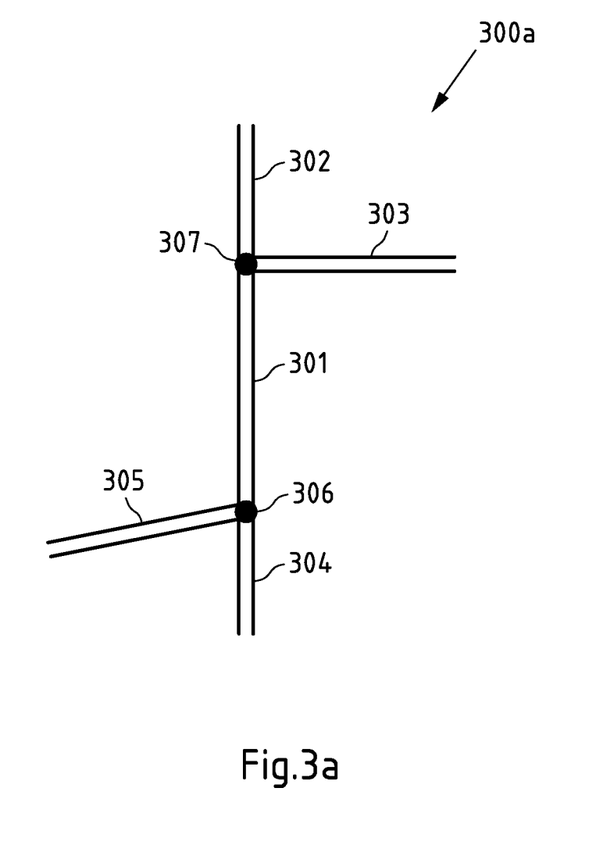
FIG. 3a-b are illustrations of at least a part of an exemplary travel network represented by map data and exemplary probe data sets of specific mobile devices travelling in the travel network.

FIG. 3a illustrates at least in part an exemplary travel network 300a represented by such map data. It comprises links 301, 302, 303, 304 and 305 and junctions 306 and 307. A link of travel network 300a may for example be understood to represent a section of the travel network which is between two junctions like link 301 which is between junctions 306 and 307.

In the following, it is assumed that the reference signs of the links correspond to unique link identifiers associated with the links and a travel direction of the links may be indicated by the characters "T" or "F". Thus, link 301 may be identified by "301T" in one travel direction and by "301F" in the other travel direction.

In an optional step 202, server 11 determines whether one or more probe data sets of a plurality of probe data sets are associated with at least one selected link of the travel network based on one or more positions represented by one or more probe data points of the one or more probe data sets. Alternatively or additionally, the probe data sets associated with the selected link of the travel network may be determined in advance and, for example, corresponding association information may be stored in program memory 102 of server 11.

Each probe data set of the plurality of probe data sets may comprise a sequence of probe data points representing a position and a speed of a mobile device. Each probe data point of a specific probe data set may comprise the identifier of the probe data set. The identifier may be indicative for a session of a service provider collecting probe data sets of a mobile device, a mobile device, or a combination thereof. Examples of such a mobile device may be a vehicle (e.g. vehicle 12), a navigation device and/or a smartphone.

The positions represented by the sequence of probe data points of a respective probe data set of the plurality of probe data sets may be GNSS positions captured by a GNSS sensor of a specific mobile device when travelling along a travel route. Alternatively or additionally, the positions represented by the sequence of probe data points of a respective probe data set of the plurality of probe data sets may be map matched GNSS position representing a GNSS position captured by a GNSS sensor of the specific mobile device that has been matched to the travel network represented by the map data. A considerable amount of such probe data sets has been collected by service providers over time and this plurality of (historic) probe data sets can be used for determining travel path-specific speed profiles for the plurality of potential travel paths. To avoid a falsification of the potential travel path-specific speed profiles due to traffic congestions, only probe data sets collected during weekends and during night, from 8 pm to 7 am, during business days may be used for determining travel path-specific speed profiles for the plurality of potential travel paths.

A probe data set may be understood to be associated with the selected link if it is associated with a travel route including the selected link. For example, a probe data set may be determined to be associated with a selected link, if one or more probe data points of the probe data set represent positions on the selected link.

Figure 3B:
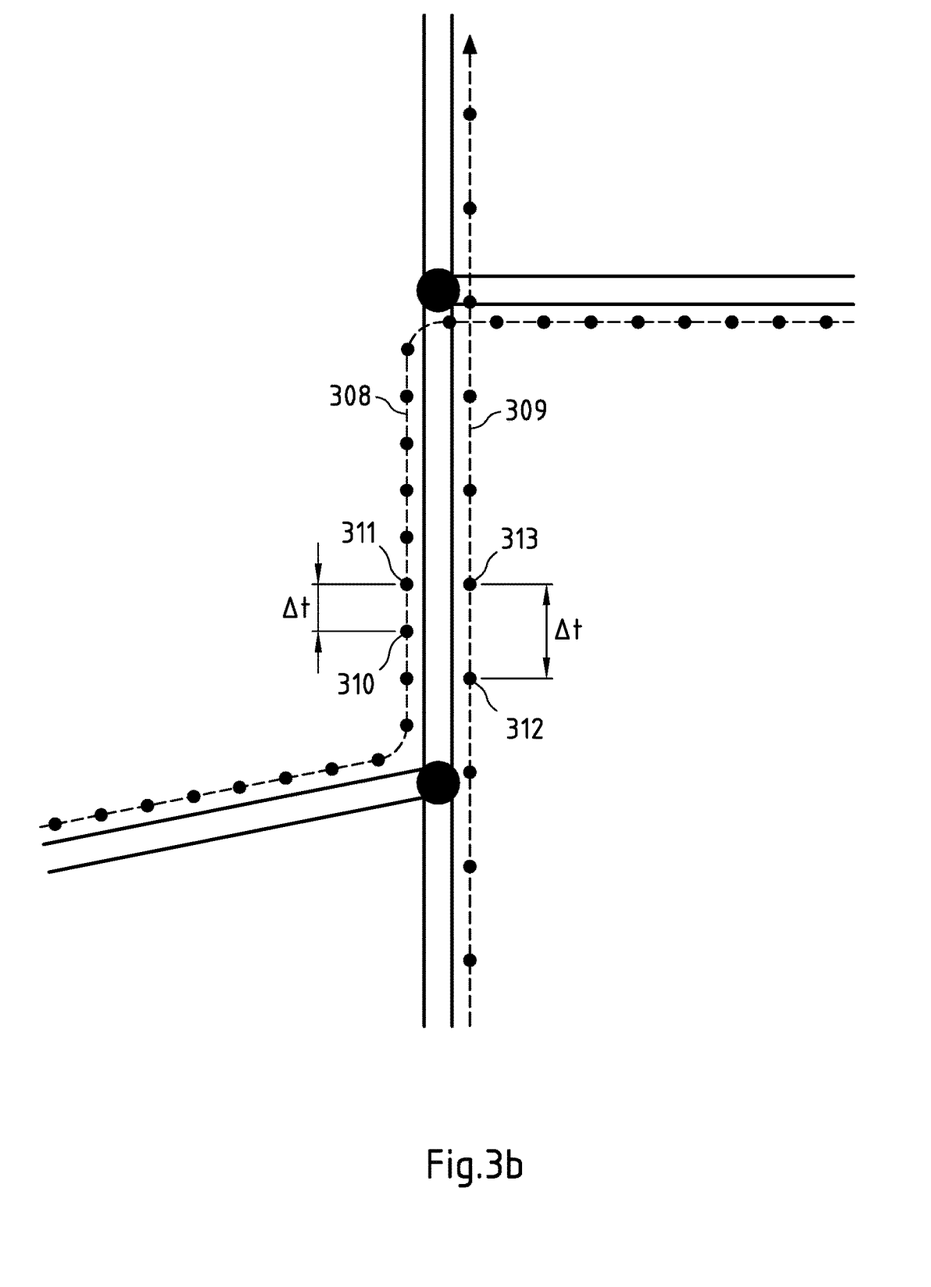

FIG. 3b illustrates exemplary probe data sets 308 and 309 of specific mobile devices travelling in the travel network 300a of FIG. 3a.

The positions represented by the sequence of probe data points of probe data sets 308 and 309 are indicated by points in FIG. 3b. For example, probe data set 308 comprises a sequence of probe data points including probe data points representing positions 310 and 311 on link 301; and probe data set 309 comprises a sequence of probe data points including probe data points representing positions 312 and 313 on link 301.

In the following it is assumed that link 301 is the selected link.

Probe data set 308 may have been generated by a mobile device (e.g. a vehicle) travelling along a travel route from link 305 through selected link 301 to link 303, and probe data set 309 may have been generated by a mobile device (e.g. a vehicle) travelling along a travel route from link 304 through selected link 301 to link 302.

Since both probe data sets 308 and 309 comprise probe data points representing one or more positions on selected link 301, they may be determined to be associated with selected link 301 in optional step 202.

As a result of the determining in step 202, a list with identifiers of probe data sets that have been determined to be associated with the selected link may be obtained. The list for selected link 301 may be as follows: {308, 309, . . . }.

In a step 203, server 11 determines at least one speed profile for the selected link at least partially based on speeds represented by a plurality of probe data points of one or more probe data sets of a plurality of probe data sets and a weighting function for weighting the speeds represented by the plurality of probe data points of one or more probe data sets of the plurality of probe data sets. Therein, the one or more probe data sets are associated with the selected link for which the speed profile is to be determined. The plurality of respective probe data points may for example comprise the probe data points of the probe data sets that are determined to be associated with the selected link in optional step 202.

In the following it is assumed that a speed profile for the selected link represents a plurality of speeds for a plurality of subsequent segments of the selected link. The selected link may be divided into the plurality of subsequent segments having the same length (e.g. 10 m).

A speed profile for a selected link may represent for each segment of this plurality of segments a weighted speed percentile or a weighted mean speed. For calculating the weighted speed percentile or the weighted mean speed for such a segment, only speeds represented by probe data points of the plurality of respective probe data points may be used that represent a position on the respective segment.

Examples of calculated weighted speed percentiles are a weighted 10% speed percentile, a weighted 25% speed percentile, a weighted 30% speed percentile, a weighted 50% speed percentile (i.e. the weighted median speed), a weighted 70% speed percentile, a weighted 75% speed percentile, a weighted 90% speed percentile or combinations thereof.

Different probe data sets may comprise probe data points associated with different probe data point frequencies.

Therein, the probe data point frequency may describe the time interval between subsequent probe data points of a sequence of probe data points of a probe data set. The probe data point frequency may for example be in the range of one probe data point per second to one probe data point per minute. Probe data points with a probe data point frequency lower than five probe data points per minute may be discarded. Due to different probe data point frequencies of the probe data sets biases may be caused which biases mean, median or other speed percentiles calculated based on these probe data sets. For example, a service provider may collect probe data sets with a relatively high probe data point frequency from a population of vehicles slower than the average. The contribution of these probe data sets may bias (non-weighted) mean speeds or (non-weighted) speed percentiles towards lower values for two reasons. The first reason is that the low speed vehicles are sampled at a higher rate than the rest of the population because of the higher frequency. Secondly, slow vehicles provide a larger number of probes along a given segment.

In FIG. 3b, the probe data point frequency of probe data sets 308 and 309 is equal as indicated by the time interval Δt between probe data points 310 and 311 and between probe data points 312 and 313. However, probe data set 309 may have been generated by a mobile device (e.g. a vehicle) travelling faster than the mobile device (e.g. another vehicle) that may have generated probe data set 308. Accordingly, probe data set 308 comprises more probe data points representing positions on selected link 310 than probe data set 308. Probe data set 308 would thus bias (non-weighted) mean speeds or (non-weighted) speed percentiles towards lower values, if they are calculated based on non-weighted speeds represented by the probe data points of probe data sets 308 and 309 representing positions on selected link 301.

To avoid such speed biases, the speeds represented by the probe data points of probe data sets associated with the selected link may be weighted with a weighting factor that is proportional to the speed represented by the respective probe data point for calculating a weighted speed percentile or a weighted mean speed.

A vehicle traveling at speed v, generating probe data points with a frequency F, on a link segment of length L (e.g. L=10 m). The number N of probe data points generated by the vehicle while traveling the distance L is N=LF/v. The number of probe data points is thus proportional with the length of the segment, the probe data point frequency and inverse proportional to the speed of the vehicle. To avoid speed biases stemming from such effects, in the calculation of a mean speed or a speed percentile, each speed represented by a probe data point may be weighted by a respective weighting factor for calculating the mean speed or a speed percentile. The weighting factor may be calculated according to the weighting function as follows:

$$W=1/N=v/LF.$$

As a result of the determining in step 203, a link-specific speed profile for the selected link (e.g. link 301) may be obtained. However, a similar approach with the same weighting factor may be also used for determining potential travel path-specific speed profiles as described above.

The steps 201 to 203 may be repeated for each link of the travel network represented by the map data. Subsequently, a speed map data may be generated representing an association of the map data and a plurality of link-specific speed profiles for the links of the travel network.

Figure 2B:
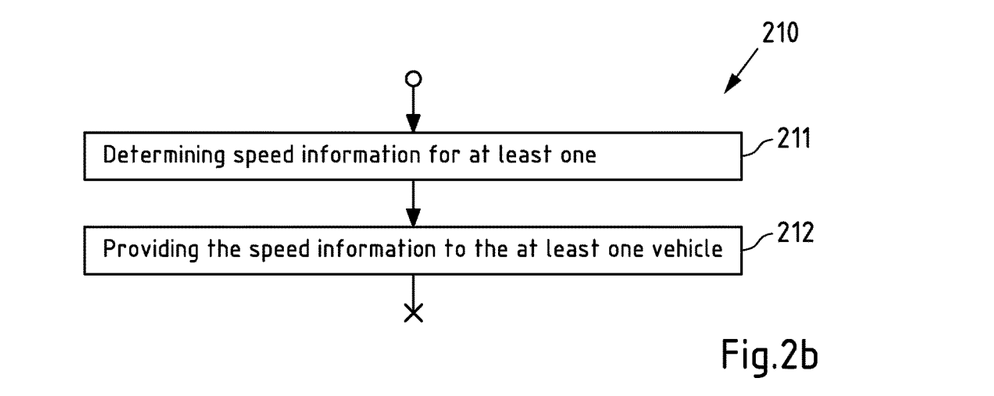

FIG. 2b is a flowchart 210 illustrating optional steps of the method according to the invention. The steps of flowchart 210 may for example be performed subsequent to the steps of flowchart 200 of FIG. 2a. In the following, it is assumed that the steps of this flowchart 210 are performed by server 11 of system 10 of FIG. 1a. Alternatively or additionally, the steps of this flowchart may be at least partially performed by vehicle 12 of system 10 of FIG. 1a.

In step 211, server 11 determines speed information for vehicle 12. For example, the speed information may at least partially represent the at least one speed profile for the at least one selected link determined in step 203 of flowchart 200 of FIG. 2a.

For example, server 11 may receive a request for determining speed information for a travel route from vehicle 12. The request may specify the links or potential travel paths included in the travel route.

The speed information for vehicle 12 may be determined to represent the speed profiles (e.g. the potential travel path-specific speed profiles or the link-specific speed profiles) for the potential travel paths or the links that are included in the travel route.

By way of example, the speed information may represent speed profiles at which despite the automotive capabilities of vehicle 12 in terms of speed, acceleration, braking, etc., a user may still feel comfortable and safe within the vehicle while traveling and/or the vehicle may interact safely with one or more other vehicles on the same route.

In step 212, server 11 may provide the speed information to vehicle 12. For example the speed information may be communicated from server 11 to vehicle 12.

Vehicle 12 may use the speed information for, at least in part, autonomously driving along the travel route. The speed information may cause vehicle 12 to at least partially control and/or adapt its speed accordingly when driving along the route represented by the travel route information.

Figure 4:
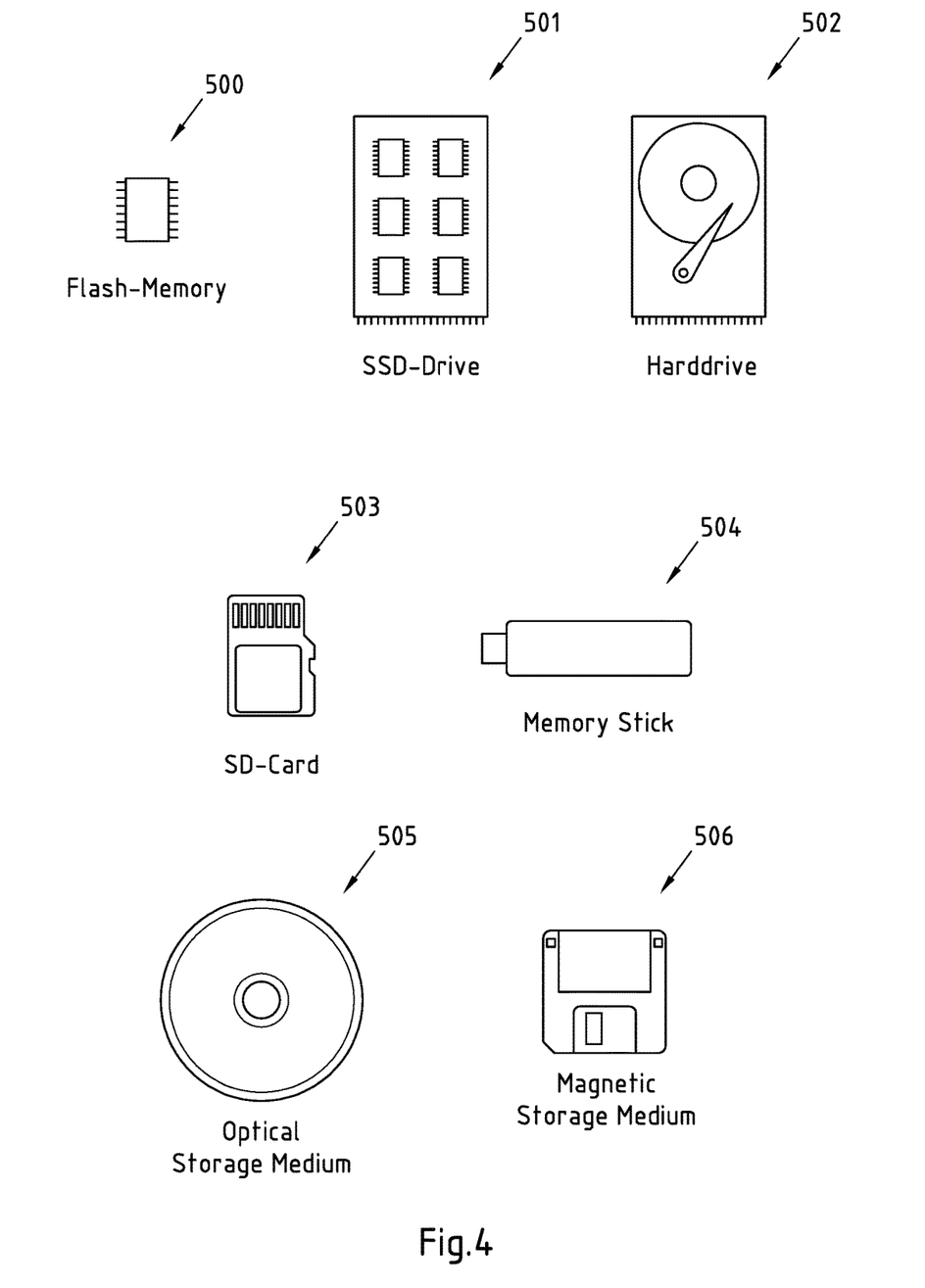
FIG. 4 is a schematic illustration of examples of tangible and non-transitory storage media according to the present invention.

FIG. 4 is a schematic illustration of examples of tangible and non-transitory computer-readable storage media according to the present invention that may for instance be used to implement program memory 102 of FIG. 1. To this end, FIG. 4 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes, steps and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, said method comprising:
obtaining or holding available map data representing, at least in part, a travel network; and
determining at least one speed profile for at least one selected link of said travel network at least partially based on speeds represented by a plurality of probe data points of one or more probe data sets of a plurality of probe data sets and a weighting function for weighting said speeds represented by said plurality of probe data points of one or more probe data sets of said plurality of probe data sets, said one or more probe data sets associated with said selected link for which said speed profile is determined,
wherein:
each probe data point represents a position and a speed, and
said at least one speed profile is at least partially determined by calculating one of one or more weighted mean speeds, one or more weighted speed percentiles, or one or more combinations thereof for said selected link or for one or more subsequent segments of said selected link.

2. The method according to claim 1, said method further comprising:
obtaining or holding available said plurality of probe data sets.

3. The method according to claim 1, wherein a speed profile for said selected link represents one speed for said selected link or a plurality of speeds for a plurality of subsequent segments of said selected link.

4. The method according to claim 1, said method further comprising:
weighting one or more speeds represented by one or more probe data points of said plurality of probe data points according to said weighting function by a respective weighting factor being proportional to a speed represented by a respective probe data point of said one or more probe data points that is weighted by said respective weighting factor.

5. The method according to claim 4, wherein said weighting factor is calculated, for each probe data point of the one or more probe data points, based on a probe data point frequency associated with said respective data point, a speed represented by said respective probe data point and a length of said selected link or of a segment of said selected link.

6. The method according to claim 4, wherein said weighting factor is determined, for each probe data point of the one or more probe data points, by determining a reciprocal for a number of probe data points of the respective probe data set representing a position on said selected link or on a segment of said link.

7. The method according to claim 1, wherein said calculating is at least partially based on one or more weighted speeds represented by one or more probe data points of said plurality of probe data points of said one or more respective probe data sets associated with said selected link.

8. The method according to claim 1, said method further comprising:
determining whether one or more probe data sets of said plurality of probe data sets are associated with said selected link based on one or more positions represented by one or more probe data points of said one or more probe data sets.

9. The method according to claim 1, said method further comprising:
determining, for said selected link of said travel network, a plurality of potential travel paths, wherein each potential travel path of said plurality of potential travel paths for said selected link is at least partially defined by an incoming link of said travel network and an outgoing link of said travel network that are linked by said selected link and a direction of travel from said incoming link to said outgoing link on said selected link, wherein, for each potential travel paths of said plurality potential travel paths, a respective speed profile for said selected link is determined.

10. The method according to claim 1, said method further comprising:
providing or generating speed map data representing an association of said map data and a plurality of speed profiles for links of said travel network, said plurality of speed profiles comprising said at least one speed profile determined for said selected link.

11. The method according to claim 1, said method further comprising:
determining speed information for at least one vehicle; and
providing said speed information to said at least one vehicle.

12. The method according to claim 11, wherein said at least one vehicle is, at least in part, an autonomous vehicle, a highly-assisted-driving vehicle, a vehicle with predictive cruise control, or a combination thereof.

13. The method according to claim 1, wherein said method is performed for a plurality of links of said travel network as selected link.

14. An apparatus comprising at least one processor and at least one memory including computer program code for one or more programs, the at least one memory and the computer program code configured to, with the at least one processor, cause the apparatus to at least:
obtain or hold available map data representing, at least in part, a travel network, and
determine at least one speed profile for at least one selected link of said travel network at least partially based on speeds represented by a plurality of probe data points of one or more probe data sets of a plurality of probe data sets and a weighting function for weighting said speeds represented by said plurality of probe data points of one or more probe data sets of said plurality of probe data sets, said one or more probe data sets associated with said selected link for which said speed profile is determined,
wherein:
each probe data point represents a position and a speed, and
said at least one speed profile is at least partially determined by calculating one of one or more weighted mean speeds, one or more weighted speed percentiles, or one or more combinations thereof for said selected link or for one or more subsequent segments of said selected link.

15. The apparatus according to claim 14, said apparatus further caused to:
obtain or hold available said plurality of probe data sets.

16. The apparatus according to claim 14, wherein a speed profile for said selected link represents one speed for said selected link or a plurality of speeds for a plurality of subsequent segments of said selected link.

17. The apparatus according to claim 14, said apparatus further caused to:
weight one or more speeds represented by one or more probe data points of said plurality of probe data points according to said weighting function by a respective weighting factor being proportional to a speed represented by a respective probe data point of said one or more probe data points that is weighted by said respective weighting factor.

18. The apparatus according to claim 17, wherein said weighting factor is calculated, for each probe data point of the one or more probe data points, based on a probe data point frequency associated with said respective data point, a speed represented by said respective probe data point and a length of said selected link or of a segment of said selected link.

19. The apparatus according to claim 17, wherein said weighting factor is determined, for each probe data point of the one or more probe data points, by determining a reciprocal for a number of probe data points of the respective probe data set representing a position on said selected link or on a segment of said selected link.

20. The apparatus according to claim 14, wherein said calculating is at least partially based on one or more weighted speeds represented by one or more probe data points of said plurality of probe data points of said one or more respective probe data sets associated with said selected link.

21. The apparatus according to claim 14, said apparatus further caused to:
determine whether one or more probe data sets of said plurality of probe data sets are associated with said selected link based on one or more positions represented by one or more probe data points of said one or more probe data sets.

22. The apparatus according to claim 14, said apparatus further caused to:
determine, for said selected link of said travel network, a plurality of potential travel paths, wherein each potential travel path of said plurality of potential travel paths for said selected link is at least partially defined by an incoming link of said travel network and an outgoing link of said travel network that are linked by said selected link and a direction of travel from said incoming link to said outgoing link on said selected link, wherein, for each potential travel paths of said plurality potential travel paths, a respective speed profile for said selected link is determined.

23. The apparatus according to claim 14, said apparatus further caused to:
provide or generate speed map data representing an association of said map data and a plurality of speed profiles for links of said travel network, said plurality of speed profiles comprising said at least one speed profile determined for said selected link.

24. The apparatus according to claim 14, said apparatus further caused to:
determine speed information for at least one vehicle; and
provide said speed information to said at least one vehicle.

25. The apparatus according to claim 24, wherein said at least one vehicle is, at least in part, an autonomous vehicle, a highly-assisted-driving vehicle, a vehicle with predictive cruise control, or a combination thereof.

26. The apparatus according to claim 14, wherein said apparatus is one of:
a server;
a stationary device;
a module for a device;
a vehicle;
an embedded navigation device of a vehicle.

27. A non-transitory computer readable storage medium including one or more sequences of one or more instructions which, when executed by one or more processors, cause an apparatus to at least perform:
obtaining or holding available map data representing, at least in part, a travel network; and
determining at least one speed profile for at least one selected link of said travel network at least partially based on speeds represented by a plurality of probe data points of one or more probe data sets of a plurality of probe data sets and a weighting function for weighting said speeds represented by said plurality of probe data points of one or more probe data sets of said plurality of probe data sets, said one or more probe data sets associated with said selected link for which said speed profile is determined,
wherein:
each probe data point represents a position and a speed, and
said at least one speed profile is at least partially determined by calculating one of one or more weighted mean speeds, one or more weighted speed percentiles, or one or more combinations thereof for said selected link or for one or more subsequent segments of said selected link.

28. The non-transitory computer readable storage medium according to claim 27, wherein a speed profile for said selected link represents one speed for said selected link or a plurality of speeds for a plurality of subsequent segments of said selected link.

29. The non-transitory computer readable storage medium according to claim 27, further including one or more sequences of one or more instructions which, when executed by one or more processors, cause an apparatus to at least perform:
  weighting one or more speeds represented by one or more probe data points of said plurality of probe data points according to said weighting function by a respective weighting factor being proportional to a speed represented by a respective probe data point of said one or more probe data points that is weighted by said respective weighting factor.

30. The non-transitory computer readable storage medium according to claim 27, wherein said calculating is at least partially based on one or more weighted speeds represented by one or more probe data points of said plurality of probe data points of said one or more respective probe data sets associated with said selected link.

31. The non-transitory computer readable storage medium according to claim 27, further including one or more sequences of one or more instructions which, when executed by one or more processors, cause an apparatus to at least perform:
  determining, for said selected link of said travel network, a plurality of potential travel paths, wherein each potential travel path of said plurality of potential travel paths for said selected link is at least partially defined by an incoming link of said travel network and an outgoing link of said travel network that are linked by said selected link and a direction of travel from said incoming link to said outgoing link on said selected link, wherein, for each potential travel paths of said plurality potential travel paths, a respective speed profile for said selected link is determined.

* * * * *